Oct. 21, 1958 P. R. BELL, JR 2,857,483

DISTRIBUTED AMPLIFIER INCORPORATING FEEDBACK

Filed June 21, 1955

INVENTOR.

BY Persa R. Bell, Jr.

Roland A. Anderson

ATTORNEY 2,857,483
Patented Oct. 21, 1958

2,857,483

DISTRIBUTED AMPLIFIER INCORPORATING FEEDBACK

Persa R. Bell, Jr., Oak Ridge, Tenn., assignor to the United States of America as represented by the United States Atomic Energy Commission Application June 21, 1955, Serial No. 517,106

2 Claims. (Cl. 179—171)

The present invention relates to electronic amplifying systems, and more especially to an improved distributed amplifier system employing feed-back for stabilization.

The principles of distributed amplification are presented by Percival in British patent specification 460,562, dated July 15, 1936. Briefly stated, in a distributed amplifier, a plurality of cascaded electron tubes are driven, not at the same time, but rather in sequence by the input signal, with their respective output signals being delayed appropriately and then added together. In conventional amplifiers, cascaded electron tubes produce a total voltage gain equal to the product of the gains of the individual tubes. To increase the bandwidth of frequencies amplified, the gain per tube must be reduced, since it has been found that the product of gain and bandwidth has an upper limit for any given tube. Conditions are not improved by connecting tubes in parallel because the circuit capacity, which limits the bandwidth, is approximately doubled by the parallel grid-cathode interelectrode capacities. In a distributed amplifier, the grid-to-ground capacities of the tubes form the capacitive elements of a low pass filter, otherwise known as a lumped constant delay line, and coils are connected consecutively between the grids, the coils forming the inductive elements of the filter. The plates of the tubes are connected to another delay line with the same propagation constant as the grid line. As a signal wave travels down the grid line, it causes a wave to propagate in both directions from each successive plate as the grid wave in its amplified form appears at the respective plates. The waves propagated in the forward direction add in phase while those propagated in the back direction do not and are absorbed in the terminating resistors at the end of the delay line. The overall gain for the system is the sum of the gains of the individual tubes.

In distributed amplifiers known to the prior art, the time delay within the amplifier has prevented the utilization of feed-back techniques to improve stability of operation. The stability of distributed amplifiers has not been entirely satisfactory, yet no means has heretofore been proposed or demonstrated for incorporating feed-back into a distributed amplifier.

Figure 3:
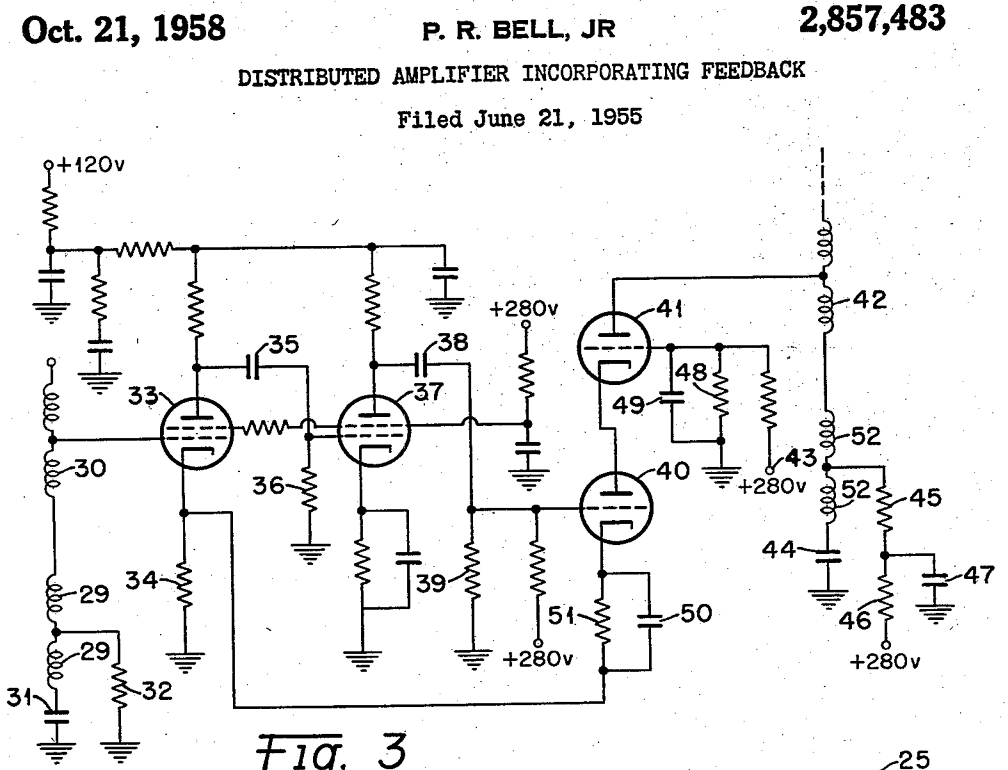
Figures 1, 2:
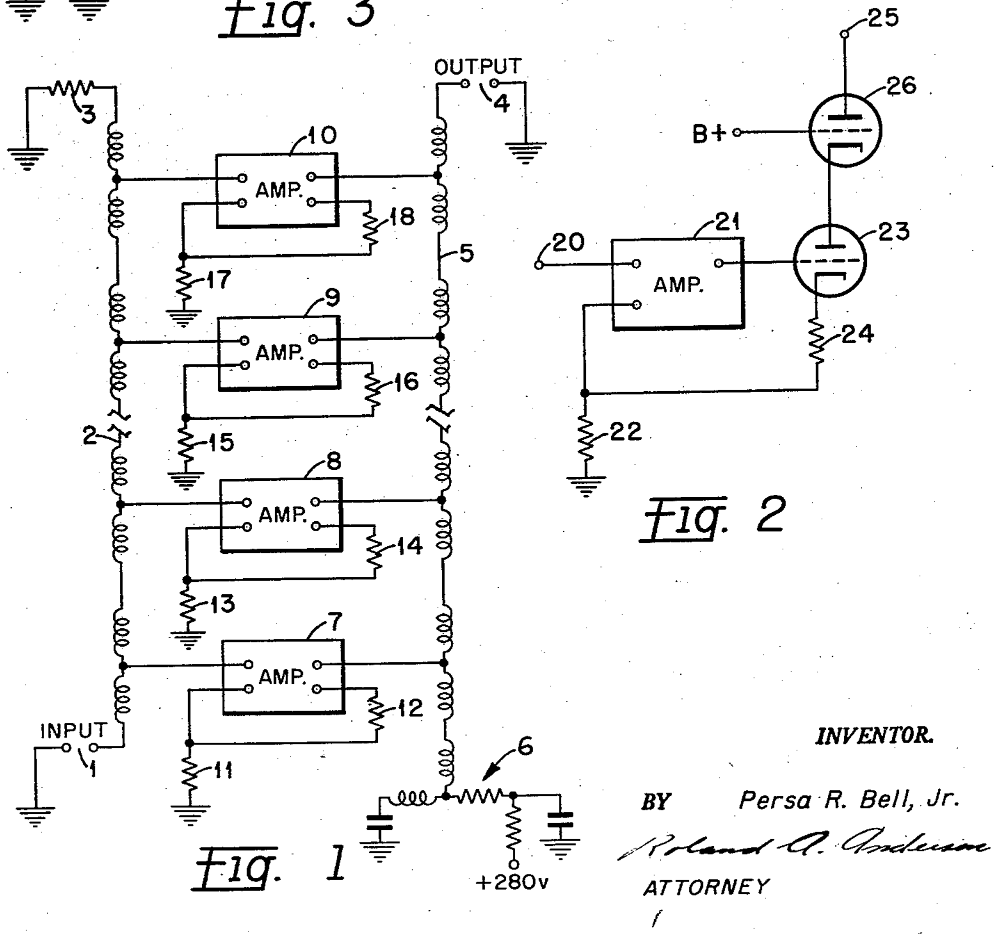

With a knowledge of the shortcomings of the distributed amplifiers known to the prior art, I have as a primary object of my invention provision of a novel distributed amplifier incorporating feed-back for increased stability. Another object of my invention is to provide a highly stabilized distributed amplifier. Yet another object of my invention is to provide a novel distributed amplifier circuit comprising a plurality of cascaded feedback amplifier stages. Other objects and advantages of the invention will become apparent from the following detailed description of a preferred embodiment thereof, when read in connection with the appended drawings in which:

Figure 1 is a block diagram including a partial schematic drawing of an amplifier constructed according to the principles of my invention, Figure 2 is a partial schematic diagram of one unit or subcombination of my novel amplifier, and Figure 3 is a schematic circuit diagram of the unit or subcombination shown in Figure 2.

In accordance with my invention, a signal to be amplified is applied to one end of a suitably terminated grid transmission line. At intervals along the transmission line, the signal is fed to stable, resistance-capacitance coupled amplifiers incorporating feed-back loops therein. The output current from each amplifier is passed through an additional tube to minimize the electrostatic capacitance between the tube elements of the last stage of the amplifier, and fed to appropriate points on an output transmission line, similar to the grid line, but terminated at the opposite (input) end. The output taken from the unterminated end of the plate transmission line is proportional to the input voltage impressed upon the grid line.

Referring first to Figure 3, the input voltage is applied to grid line 30 and a portion of the signal is applied to the control grid of tube 33. The signal is amplified and coupled through resistor 36 and condenser 35 to the control grid of tube 37. The signal from the plate of tube 37 is coupled through condenser 38 and resistor 39 to the control grid of tube 40. The cathode of tube 40 is coupled through resistor 51 and condenser 50 to the cathode of tube 33 and resistance 34. The output of the tube 40, rather than being derived from the cathode in the usual fashion, is coupled from its plate to the cathode of cascade-connected tube 41, the plate of which is coupled to a point of the plate transmission line 42. The control grid of tube 41 is coupled to a source of high positive voltage 43. Energizing voltage for tube 41 is supplied from the source 43 through resistor 46 and resistor 45 to a suitable point on the plate line 42. Condenser 47 is a decoupling condenser for the high voltage supply. Energizing voltage for tubes 33, 37 is supplied from a source of, for example, +120 volts.

Figure 2 illustrates partially in block diagram the detailed circuit of Figure 3 and includes an input terminal 20 for connecting to the grid line, an amplifier section 21, feed-back resistors 24, 22, tube 23, output tube 26 coupled to the plate of tube 23, and output lead 25 for connecting to the plate transmission line. A source of B+ potential is coupled to the grid of tube 26. This drawing clearly shows the application of feed-back in each individual amplifying stage of the overall amplifier.

Referring now to Figure 1, showing the overall amplifier, the input voltage is applied at the terminals 1 to one end of the grid transmission line 2, which is terminated in its characteristic impedance 3. At equal intervals along the line 2, the signal is picked off and led to the input of amplifiers 7—10. The signals are amplified in these highly stable amplifiers, which include feed-back resistors 11—18. The amplified outputs are applied in sequence to appropriate points on the plate transmission line 5, which is terminated at the input end by its characteristic impedance 6, and the amplified output voltage is derived across terminals 4.

It may be demonstrated that the output current is proportional to the input voltages of my novel amplifier by the following derivation, wherein: the total gain of the system is represented as A, $g_{m1}$ is the cathode mutual conductance of the first tube in amplifier 21, $E_S$ is the input voltage at terminal 20, $E_I$ is the input voltage to amplifier 21, $E_0$ is the voltage at the cathode of tube 23, $I_0$ is the current at the plate of tube 23, $I_1$ is the current through resistor 22, $R_1$ is the resistance of resistor 22, $R_2$ is the resistance of resistor 24, and $E_F$ is the voltage across resistor 22.

$$E_0=AE_I,\ E_I=E_S-E_F$$
$$E_F=I_1R_1,\ I_1=I_0-E_Ig_{m1}$$
$$I_0=\frac{E_0-E_F}{R_2}=\frac{AE_I-E_S}{R_2} \quad (1)$$
$$E_F=R_1I_0-E_Ig_{m1}R_1 \quad (2)$$
$$E_I=E_S-R_1I_0+E_Ig_{m1}R_1 \quad (3)$$
$$E_I=\frac{E_S-R_1I_0}{1-g_{m1}R_1} \quad (4)$$
$$E_I=\frac{R_2I_0+E_S}{A+1} \quad (5)$$

Combining Equations 1 and 5

$$\frac{I_0}{E_S}=\frac{1-\left[\frac{1-g_{m1}R_1}{A+1}\right]}{R_1+\left[\frac{1-g_{m1}R_1}{A+1}\right]R_2}$$

If $A+1>>1-g_{m1}R_1$ (which is the normal case) then $$\frac{I_0}{E_S}\approx\frac{1}{R_1}$$

Therefore, since the current at the plate of tube 26 is the same as $I_0$, the current is stabilized and is proportional to the input signal $E_S$.

Both the grid and place transmission lines of Figure 3 are of the "*m*" derived type. It has been shown that best results are obtained with an "*m*" of 1.27, and that negative mutual inductance may be used to eliminate the need for any inductance in the shunt arm. According to this method of design, a compromise is first arrived at in determining the characteristic impedance $Z_0$ of the plate line between gain per tube and pass band desired in the amplifier. The high frequency cut-off $f_C$ of a delay line inversely varies with the line impedance, and is given by the equation $$f_c=\frac{1}{2Z_0C}$$

where $Z_0$ is the impedance of the line considered to be a pure resistance, and C is the unavoidable shunt capacity of each section, divided by the value of "*m*." The grid line must be designed for the same cut-off frequency as the plate line because the delay per section of both lines must be equal. The required value of the inductance of each coil L and the mutual inductance M, corrected for lead inductance, may be calculated when $Z_0$, C, and value of lead inductance M' are known.

Suitable grid and plate lines maay be wound on a ¼" polystyrene rod. For example, the grid coils 30 may comprise 34 turns of #30 formvar wire, wound as one continuous center-tapped coil, with $$\frac{L'}{2}=1.45 \text{ microhenries}$$

and $M=0.341$. The end coils 29, which form part of the termination, may be 16 turns of the same wire, giving 1.18 microhenries inductance per coil. The plate coils 42 may comprise 40 turns of #32 formvar wire, wound as a continuous center-tapped coil, with $$\frac{L'}{2}=2.03 \text{ microhenries}$$

and $M=0.477$. The end coils 52 forming part of the termination may be 19 turns of #32 wire, while resistor 46, which connects the plate line to the high voltage source (+280 v.) may be 100 ohms. Terminating resistors 3, 6 of Figure 1 are seen to be a simplification of the actual terminating impedances of Figure 3, the impedance value being determined by the appropriate impedances of the tubes chosen as tubes 33 and 41. For a further discussion of line construction, see "Proceedings of the Institute of Radio Engineers," volume 6, No. 8, pages 956–969.

It will be apparent to those skilled in the art that the advantages of the feedback-stabilized amplifier have been incorporated into a distributed amplifier system, yet the wideband characteristic of the distributed amplifier has been preserved.

Having described the invention, what is claimed as novel is:

1. An improved stabilized distributed amplifier comprising an input artificial transmission line terminated at one end in its characteristic impedance; an output artificial transmission line terminated at one end in its characteristic impedance; and a plurality of parallel connected distributed amplifier stages, each of said stages comprising at least first and second amplifier tubes, resistance-capacitance coupling networks connected between said amplifier tubes, first and second output tubes connected in cascade, each of said tubes including cathode, grid and plate electrodes; means coupling the input of said first amplifier tube of each of said stages to a distributed point on said input transmission line; means coupling the output of said first amplifier tube to the input of said second amplifier tube, means coupling the output of said second amplifier tube to the input of said first output tube, means connecting said cathodes of each of said amplifier tubes to ground through an impedance, impedance means connecting the cathode of said first output tube to a point intermediate the cathode and grounded impedance of said first amplifier tube, and means coupling the plate of said second output tube to a distributed point of said output transmission line.

2. An improved stabilized distributed amplifier comprising input and output artificial transmission lines each terminated at one end in its characteristic impedance and a plurality of parallel connected amplifying stages, an input for each stage coupled to a distinct point on said input transmission line, each of said stages comprising a plurality of sequentially coupled amplifier tubes, an output from the last of said amplifier tubes in sequence, first and second cascade-connected tubes, each of said tubes including cathode, grid and plate electrodes, a negative feedback connection between the cathode of said first output tube and the cathode of a first of said amplifier tubes, means for connecting the cathodes of said amplifier tubes to ground, means for connecting the grid of said first output tube to said output from the last of said amplifier tubes, and means connecting the plate of said second output tube to a distinct point on said output transmission line.

References Cited in the file of this patent

UNITED STATES PATENTS

| | | |
|---|---|---|
| 2,670,408 | Kelley | Feb. 23, 1945 |
| 2,778,888 | Bradley | Jan. 22, 1957 |